(12) United States Patent
Ashida et al.

(10) Patent No.: US 9,025,271 B2
(45) Date of Patent: May 5, 2015

(54) METHOD FOR READING FILE USING PLURALITY OF TAPE MEDIA

(71) Applicant: International Business Machines Corporation, Armonk, NY (US)

(72) Inventors: Takashi Ashida, Tokyo (JP); Hiroshi Itagaki, Tokyo (JP); Setsuko Masuda, Tokyo (JP); Tsuyoshi Miyamura, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/473,303

(22) Filed: Aug. 29, 2014

(65) Prior Publication Data

US 2015/0062733 A1    Mar. 5, 2015

(51) Int. Cl.
*G11B 15/46*    (2006.01)
*G06F 3/06*    (2006.01)
*G11B 5/008*    (2006.01)

(52) U.S. Cl.
CPC .......... *G06F 3/0613* (2013.01); *G11B 5/00813* (2013.01); *G06F 3/0656* (2013.01); *G06F 3/0686* (2013.01); *G06F 2003/0691* (2013.01); *G06F 2003/0698* (2013.01)

(58) Field of Classification Search
CPC .............. G11B 15/52; G11B 15/1875; G11B 2220/90; G11B 15/44; G11B 15/06; G06F 3/0601; G06F 3/0686; G06F 3/0605

USPC .......... 360/8, 29, 32, 40, 73.04, 73.05, 73.06, 360/72.3, 78.03; 711/111, 112, 113, 114, 711/170, 165
See application file for complete search history.

(56) References Cited

U.S. PATENT DOCUMENTS 7,126,770 B1 * 10/2006 Arai et al. ........................ 360/8
7,225,315 B2    5/2007 Liu et al.

FOREIGN PATENT DOCUMENTS

JP    2005148854 A    6/2005

* cited by examiner

*Primary Examiner* — Nabil Hindi
(74) *Attorney, Agent, or Firm* — Stephen R. Tkacs; Stephen J. Walder, Jr.; Randall J. Bluestone

(57) ABSTRACT

A storage system includes a plurality of tape drives connected to a host, and a buffer configured to temporarily hold data read from the drives. A mechanism loads a plurality of media on which a file has been written to the plurality of drives so as to mount the plurality of media in the plurality of drives and divides the file into a plurality of data portions in an order. The mechanism determines a medium that takes the shortest time to move from a current position of a read head of a corresponding drive to a beginning position of the file and one or more media from which following data portions of the beginning data portion are to be read. The mechanism executes reading of the following data portions from the next media and temporarily holding of the read following data portions in the buffer of the storage system while reading the beginning data portion of the file from the first medium to the host.

20 Claims, 6 Drawing Sheets

NOTE)
· WRAP TURN: REVERSING RUNNING DIRECTION OF TAPE RELATIVE TO HEAD AT BOT AND EOT OF EVEN-NUMBERED AND ODD-NUMBERED WRAPS (WRAP CHANGE)
· DECIDING POSITION ALONG LONGITUDINAL DIRECTION BY lpos

TAPE DIRECTORY

| WRAP | lpos | BLOCK |
|---|---|---|
| 0 | $x_0$ | 0 |
| 0 | $x_0 + x_n/2$ | 1000 |
| 0 | $x_0 + x_n$ | 2000 |
| 1 | $x_0 + x_n/2$ | 3000 |
| 1 | $x_0$ | 4000 |
| 2 | $x_0 + x_n/2$ | 5000 |
| 2 | $x_0 + x_n$ | 6000 |
| 3 | $x_0 + x_n/2$ | 7000 |

FIG. 4B  EXAMPLE OF REWRITING TO TAPE DIRECTORY WITH VIRTUAL lpos

| VIRTUAL lpos | BLOCK |
|---|---|
| 0 | 0 |
| $x_n/2$ | 1000 |
| $x_n$ | 2000 |
| $x_n + x_w$ | 2000 |
| $3x_n/2 + x_w$ | 3000 |
| $2x_n + 2x_w$ | 4000 |
| $2x_n + 2x_w$ | 4000 |
| $5x_n/2 + 2x_w$ | 5000 |
| $3x_n + 2x_w$ | 6000 |
| $3x_n + 3x_w$ | 6000 |
| $7x_n/2 + 3x_w$ | 7000 |

FIG. 5A
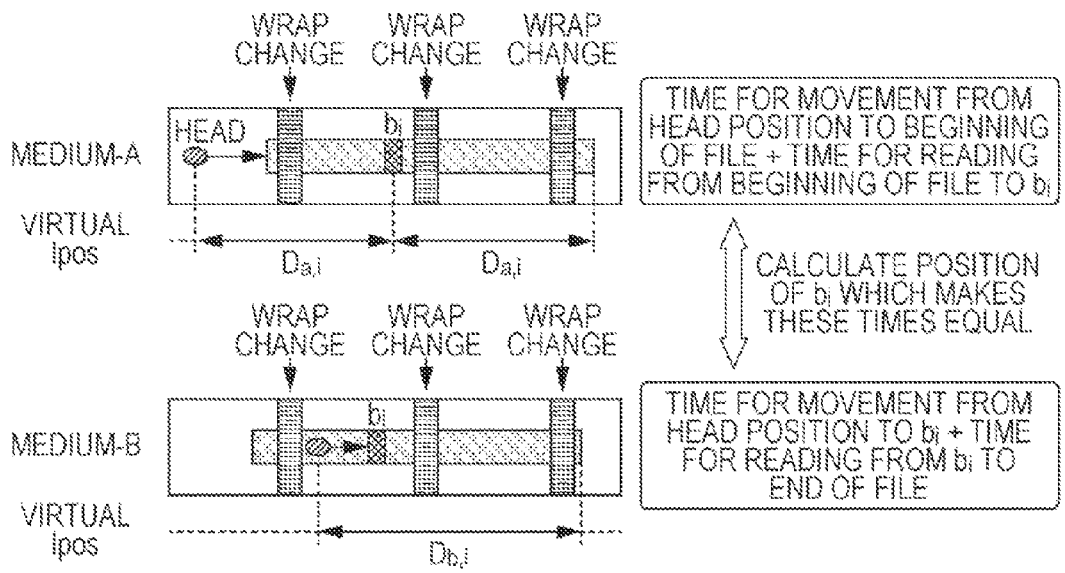
FIG. 5B  READ WRAP POSITION AND HEAD POSITION ON ACTUAL MEDIUM
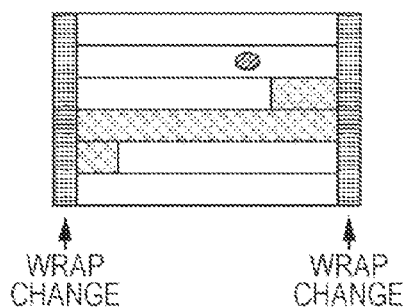

METHOD FOR READING FILE USING PLURALITY OF TAPE MEDIA

BACKGROUND

The present invention relates to a method for improving performance of reading a file by using a plurality of tape media. More specifically, the present invention relates to a method for reading a file at a high speed from two media holding identical files by using a file system, LTFS (Linear Tape File System) has been put into practical use as a mechanism allowing a tape drive (magnetic tape drive) to access data stored on tape media (media or tapes) as files. LTFS associates pieces of meta information, such as information about where data portions of files exist on tapes, with one another as Index (indices), thereby implementing a file system.

When data is held in a tape drive, high reliability and performance enabling high-speed file reading and writing are always required of LTFS. A long seek time taken to seek a data position where a file is stored is a drawback which is unavoidable in the case where files are stored in a tape drive.

This performance drawback is caused by the following reasons:

A tape drive is a sequential access storage device, and running the tape from one end thereof to the other in the longitudinal direction takes approximately two minutes. A medium on which data is to be written is divided into wraps at positions in the widthwise direction of data writing. A long time is taken to change the writing direction at the end of each wrap (wrap change). While data is being successfully read, for example, fifth-generation LTO (Linear Tape Open) (hereinafter, referred to as "LTO5") tape drives have a read speed of 140 MB/sec, which is comparable to the level of HDDs. However, once LTO5 tape drives fail to read data, they re-read the data from the same position to perform an error recovery procedure (ERP). This re-reading requires a backhitch operation for rewinding the tape, and becomes a cause of the performance degradation.

The primary purpose for the user to store data on tape media is to store data at high reliability. For this purpose, instead of storing data only on one highly reliable medium, the same data is generally stored additionally on another medium for backup, Accordingly, it is necessary to consider achieving a higher speed by efficiently reading data written on two media, namely, main and backup media.

Japanese Patent Application Publication No. 2005-148854 discloses high-speed data reading by using a technique including a plurality of disk devices. Reading a file at a high speed by using a plurality of tape media is also strongly required of a storage system including a plurality of tape drives.

SUMMARY

Accordingly, the present invention aims to provide a method, a tape drive, and a program product for improving performance of reading one file by using a plurality of media.

In one illustrative embodiment, a method is provided for reading a file from a plurality of tape media on which the file has been written, in a storage system including a plurality of tape drives connected to a host, and a buffer configured to temporarily hold data read from the plurality of drives. This method for reading includes loading all the plurality of media on which the file has been written to the plurality of drives so as to mount the plurality of media in the plurality of drives; dividing the file into a plurality of data portions in an order, determining a medium from which a beginning data portion is to be read, the first medium being a medium that takes the shortest time to move from a current position of a read head of a corresponding drive to a beginning position of the file, and determining one or more media (next media) from which following data portions of the beginning data portion are to be read, from among the rest of the plurality of media in accordance with predetermined condition; and executing, in parallel for all the following data portions to be read from the next media, reading of the following data portions from the next media determined in accordance with the predetermined condition and temporarily holding of the read following data portions in the buffer of the storage system while reading the beginning data portion of the file from the first medium to the host, and then reading and transmitting the held following data portions to the host in accordance with the order so as to form the file.

In another illustrative embodiment, a storage system is provided for reading a file from a plurality of tape media (media) on which the file has been written, the storage system comprising a plurality of tape drives connected to a host; and a buffer configured to temporarily hold data read from the plurality of drives. A read controller of this storage system is configured to load all the plurality of media on which the file has been written to the plurality of drives so as to mount the plurality of media in the plurality of drives, divide the file into a plurality of data portions in an order, determine a medium from which a beginning data portion is to be read, the first medium being a medium that takes the shortest time to move from a current position of a read head of a corresponding drive to a beginning position of the file, and determine one or more media from which following data portions of the beginning data portion are to be read, from among the rest of the plurality of media in accordance with a predetermined condition, and execute, in parallel for all the following data portions to be read from the next media, reading of the following data portions from the next media determined in accordance with the predetermined condition and temporarily holding of the read following data portions in the buffer of the storage system while reading the beginning data portion of the file from the first medium to the host, and then read and transmit the held following data portions to the host in accordance with the order so as to form the file.

In yet another illustrative embodiment, a program product is provided for reading a file from a plurality of tape media on which the file has been written, in a storage system including a plurality of tape drives connected to a host, and a buffer configured to temporarily hold data read from the plurality of drives. The program product causes the storage system to load all the plurality of media on which the file has been written to the plurality of drives so as to mount the plurality of media in the plurality of drives; divide the file into a plurality of data portions in an order, determine a medium from which a beginning data portion is to be read, the first medium being a medium that takes the shortest time to move from a current position of a read head of a corresponding drive to a beginning position of the file, and determine one or more media from which following data portions of the beginning data portion are to be read, from among the rest of the plurality of media in accordance with a predetermined condition; and execute, in parallel for all the following data portions to be read from the next media, reading of the following data portions from the next media determined in accordance with the predetermined condition and temporarily holding of the read following data portions in the buffer of the storage system while reading the beginning data portion of the file from the first medium to the host, and then read and transmit the held following data portions to the host in accordance with the order so as to form the file.

By employing the above-described configurations, a storage system including a plurality of tape drives can improve its file read speed.

BRIEF DESCRIPTION OF THE SEVERAL VIEWS OF THE DRAWINGS

FIGS. 4A and 4B illustrate an example of a tape directory in accordance with an illustrative embodiment;

FIGS. 5A and 5B are conceptual diagrams of an operation for reading one file from two media in accordance with an illustrative embodiment.

DETAILED DESCRIPTION

The following describes an example embodiment of a method for reading a file by using both an original medium and a backup medium.

In response to an access request from a host, LTFS accesses a file recorded in a tape library (storage system) which includes two tape drives.

Both the original medium on which the file has been written by LTFS and the backup medium (or copy medium) created as backup of the original medium are used to read data.

Based on the states of the two media having been loaded to the two drives, one of the media which requires a shorter time for a read head of the drive to move to the beginning position of the file is selected and used to read the file from the beginning. The other of the media is used to read a second portion of the file. When the medium has not been loaded to the drive, the time taken to move the medium from a storage slot to the drive and to load the medium to the drive is also taken into account. The selected medium is referred to as a first medium. The other medium is referred to as a next medium (or second medium).

A position from which the second data portion is to be read from the next medium is calculated. This position is calculated so that the time taken to read data up to that located immediately in front of this position from the first medium becomes equal to the time taken from when reading of data from he next medium is started to when the end of the file is read. The calculated position is a time-based intermediate position, and thus is referred to as an intermediate time position or intermediate block. The file system calculates this intermediate time position in advance, and starts reading from the intermediate time position for the next media.

The data read from the next medium is held in a buffer manager by the file system. In the case where the data is transmitted to the host, after the completion of reading of the beginning data portion from the first medium, the following data portion is transmitted from the buffer to the host.

The illustrative embodiments are applicable to a storage system environment in which two or more tape drives are managed by a host (server). An embodiment will be described using a tape library which is a typical example.

Figure 1:
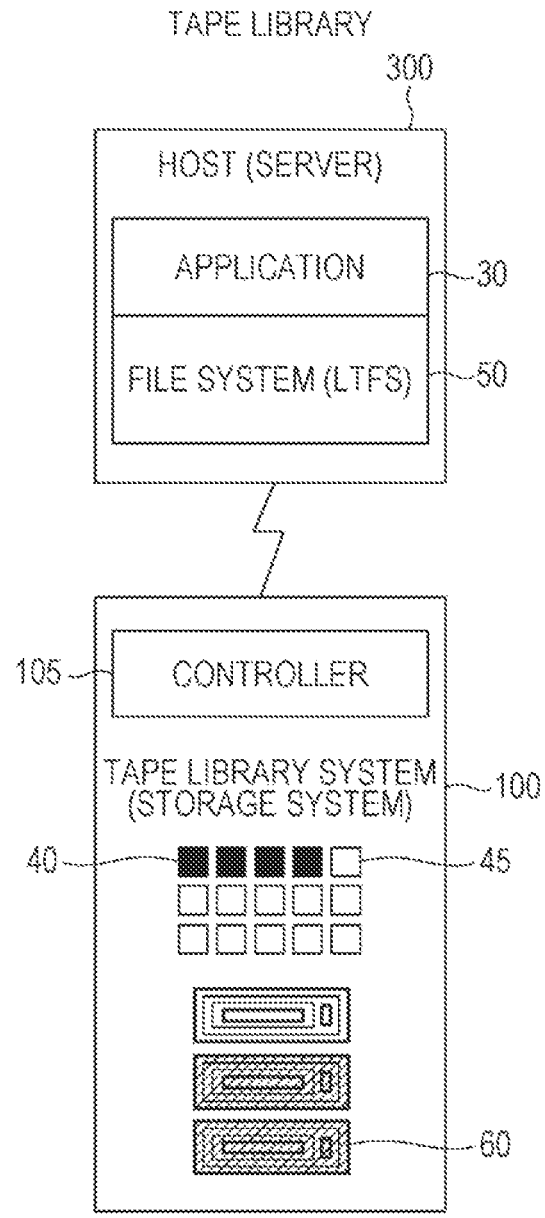
FIG. 1 illustrates an example of the configuration of a tape library system including a plurality of tape drives in accordance with an illustrative embodiment.

FIG. 1 illustrates an example of the configuration of a tape library system including a plurality of tape drives in accordance with an illustrative embodiment. A storage system 100 includes three tape drives 60, tape cartridges 40, slots 45 for housing the tape cartridges 40, and a controller 105. The storage system 100 includes many tape cartridges 40 housed in the slots 45. The controller 105 controls communication for receiving read and write requests from a host 300 and controls reading and writing performed by the plurality of tape drives 60 in order to execute the requests.

A library manager (not illustrated) is provided between the host 300 and the storage system 100, and manages the plurality of tape drives 60 and the plurality of tape cartridges 40. The library manager virtualizes the plurality of tape cartridges 40 and the tape drives 60, and performs read/write control. The library manager temporarily holds a command received from an application 30, and outputs a Small Computer Systems Interface (SCSI) command or the like corresponding to the received command to the storage system 100. IBM Tape System Library Manger (TSLM) is an example of a library manager. The application 30 of the host 300 is capable of issuing a react/write request on a file-by-file basis to the storage system 100 via a file system (LTFS) 50. The file system 50 includes a buffer (not illustrated) that temporarily holds data subjected to a file read/write request received from the application 30. The host 300 of the storage system 100 allocates this buffer to the file system 50. The storage system 100 is controlled in accordance with various commands (such as read, write, and positioning) issued by the application 30. IBM Tivoli Storage Manager is an example of an application 30 that may serve as dedicated software.

The library manager receives a load request command from the application 30 as a command. When this command is executed, the library manager typically searches for an empty tape drive from the plurality of (three) tap drives 60. The tape cartridge 40 specified by the load request command is loaded to the loadable empty tape drive. When three tape drives 60 are in use, the library manager is kept waiting until an empty tape drive becomes available. The tape library system is usable also on a file system just like HDDs or the like. For example, the LTFS 50 enables data written on media to be shown as files.

Figure 2:
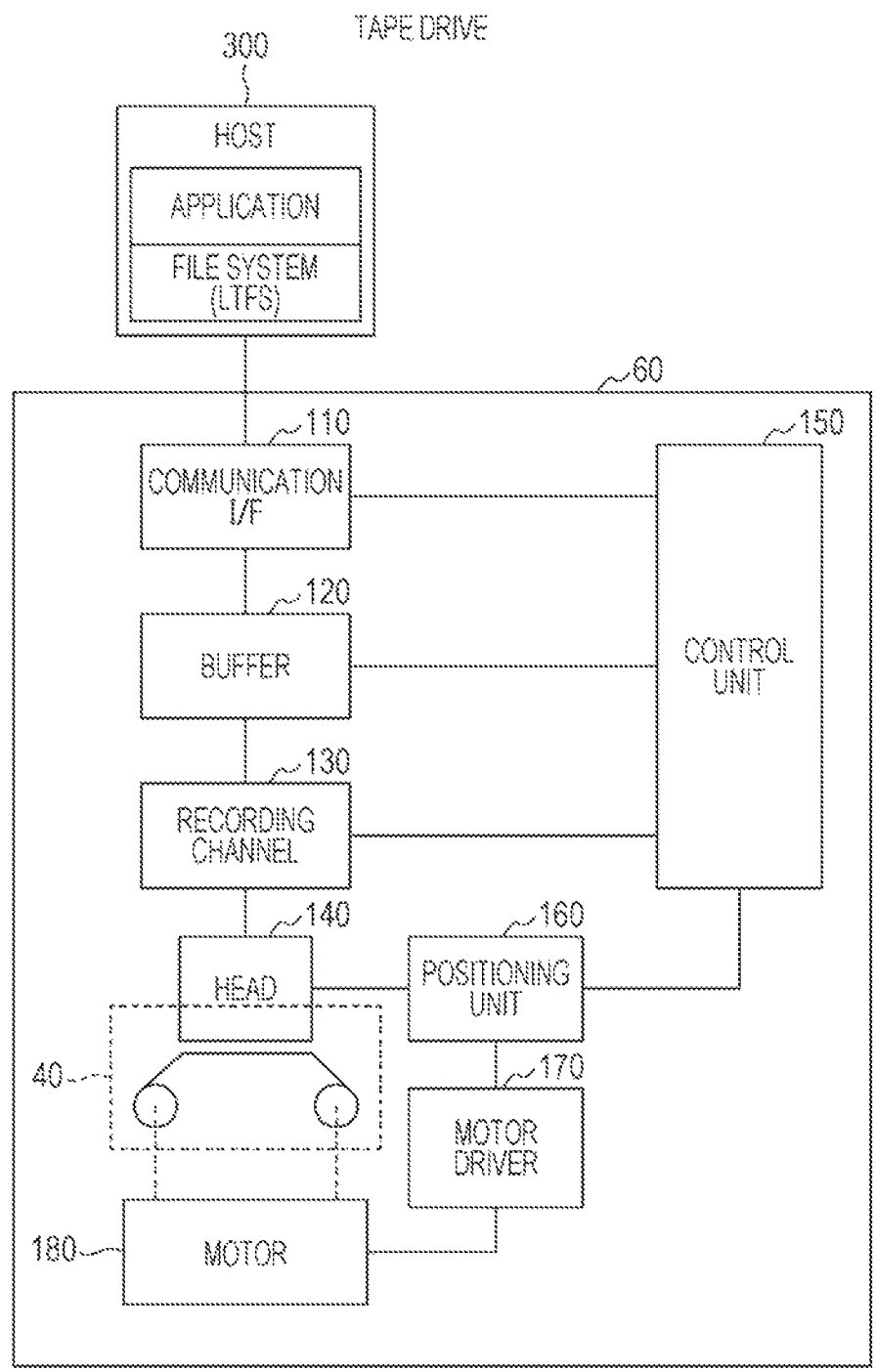
FIG. 2 illustrates an example of the hardware configuration of a tape drive in accordance with an illustrative embodiment.

FIG. 2 illustrates an example of the hardware configuration of the tape drive (magnetic tape drive) 60 in accordance with an illustrative embodiment.

This tape drive 60 includes a communication I/F (interface) 110, a buffer 120, a recording channel 130, a read/write head 140, a control unit 150, a positioning unit 160, a motor driver 170, and a motor 180.

The communication I/F 110 performs communication with the host 300 via a network. For example, the communication I/F 110 receives, from the host 300, a write command that specifies writing of data to the tape cartridge (medium or tape) 40. Also, the communication I/F 110 receives, from the host 300, a read command that specifies reading of data from the medium 40. The communication I/F 110 has functions of compressing to-be-written data and of decompressing read data, thereby almost doubling the amount of data actually stored on a medium.

The tape drive 60 performs reading and writing to the medium 40 in units of data sets (hereinafter, referred to as DS) each of which is constituted by a plurality of records transmitted from the host 300. The typical size of a DS is 4 MB. The file system 50 of the host 300 specifies a file and specifies records with a SCSI command, and transmits a write/read request (Write/Read) to the tape drive 60. A DS is constituted by a plurality of records.

The buffer 120 is a memory that temporarily accumulates data to be written to the medium 40 or data read from the medium 40. For example, the buffer 120 may be constituted by a DRAM (Dynamic Random Access Memory). The recording channel 130 is a communication channel used to write data accumulated in the buffer 120 to the medium 40 or to temporarily accumulate data read from the medium 40 in the buffer 120.

The read/write head 140 includes data read/write elements, and writes data to the medium 40 and reads data from the medium 40. The read/write head 140 also includes a servo read element, and reads a signal from servo tracks provided on the medium 40. The positioning unit 160 instructs the read/write head 140 to move in the breadthwise direction (widthwise direction) of the tape cartridge 40. The motor driver 170 drives the motor 180. A longitudinal-direction position of the tape is defined by a longitudinal position (lpos), which is encoded in a servo pattern written over the entire length of the tape.

The tape drive 60 writes data on the tape or reads data from the tape in accordance with a command received from the host 300. The tape drive 60 includes a buffer, a read/write channel, a head, a motor, and a reel for winding the tape, a read/write controller, a head position control system, and a motor driver. The tape drive 60 removably loads the tape cartridge 40. The tape moves in its longitudinal direction as the reel rotates. The head moves in the longitudinal direction of the tape to write data to or read data from the tape. The tape cartridge 40 includes a noncontact nonvolatile memory called a cartridge memory (CM). The tape drive 60 writes data to or reads data from the CM included in the tape cartridge 40 in a noncontact manner. The CM holds a cartridge property. When performing reading and writing, the tape drive 60 obtains the cartridge property from the CM so as to enable optimum reading and writing. The CM holds a tape directory which represents a rough correspondence between the lpos, the wrap, and a block to be described later.

The control unit 150 controls the entirety of the tape drive 60. Specifically, the control unit 150 controls writing of data to the medium 40 and reading of data from the medium 40 in accordance with a command received from the communication I/F 110. Also, the control unit 150 controls the positioning unit 160 in accordance with a signal read from the servo tracks. Further, the control unit 150 controls operations of the motor 180 via the positioning unit 160 and the motor driver 170. Note that the motor driver 170 may be directly connected to the control unit 150.

The tape drive 60 is also usable on a file system just like HDDs or the like. For example, the LTFS 50 enables data written on media to be shown as files. The host 300 includes a buffer used by the file system 50 to hold read/write data. The tape drive 60 divides the tape into two or more partitions. Each partition can be treated as if it were a single tape, and data can be selectively written in each partition. An index includes, for data of each file, a path and name of the file and position information (extent) of the file on the medium.

Figure 3A:
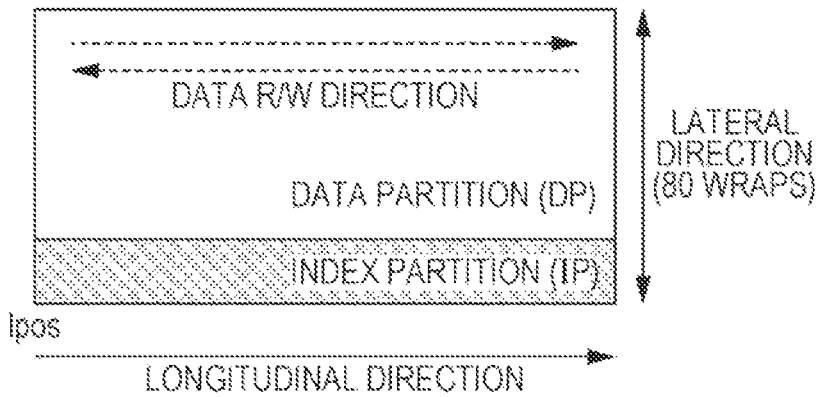
FIGS. 3A and 3B illustrate the LTFS format of an LTO5 tape in accordance with an illustrative embodiment.
Figure 3B:
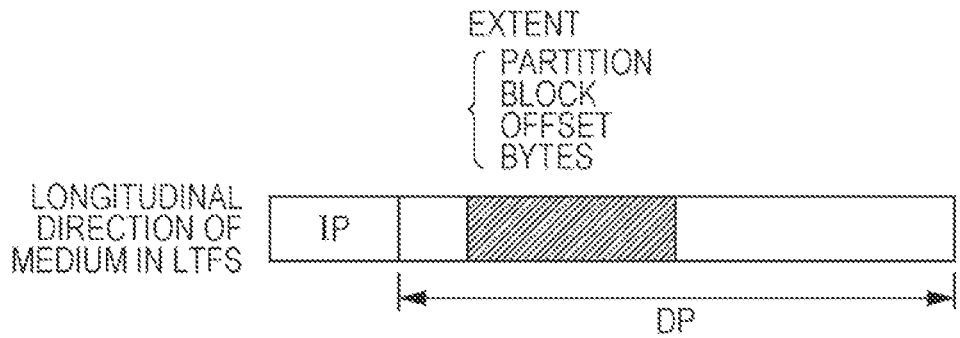

FIGS. 3A and 3B illustrate the LTFS format of an LTO5 tape in accordance with an illustrative embodiment.

FIG. 3A illustrates that the widthwise direction of the tape is divided into two partitions. An LTO5 tape drive writes data in wraps of a write region by running the tape forward and backward along the longitudinal direction of the tape. In the case of using a tape medium on LTFS, the tape medium is divided into two partitions, namely, an index partition (IP) and a data partition (DP), and is used. The tape is divided into two partitions, i.e., the IP and the DP, from the beginning of the tape (BOT) to the end of the tape (EOT). A wrap can be considered as a track in general. The LTO5 tape cartridge includes a tape having a length of approximately 800 m and a width equivalent to 80 wraps. The IP and the DP are separated by a guard band constituted by two wraps. The tape moves forward and backward along the longitudinal direction of wraps. Changing the moving direction at the BOT and the EOT is called a wrap change or wrap turn. The number of partitions is changeable to any value larger than or equal to 3 in accordance with various specifications.

FIG. 3A illustrates that a physical position along the longitudinal direction of a wrap is specified by the lpos. In LTO, the position of data is represented using the wrap and the lpos. The wrap represents the widthwise position of the tape, and the lpos represents the longitudinal position of the tape. The lpos is encoded in a servo pattern written over the entire length of the tape. In the case of LTO tapes, one lpos is equivalent to 7.2 mm.

FIG. 3B illustrates that the position of a file on the medium is represented using an extent in LTFS. When the user writes data on a tape medium using LTFS, meta information called an index file (also simply referred to as an "index") is written on the tape medium in addition to the body of the file. The index includes information such as the file name and the file creation date and time. In the IP, the most recent index is mainly written. In the DP, the body of the file and an index history are written. Each file has one or more extents. An extent is represented using a partition (partition) that holds the file, a block number (block) of a block storing the beginning data of the file, a position offset (offset) of the beginning data of the file within the block, and the number of bytes (bytes) of the data constituting the file. The use of a plurality of extent allows data written at different positions on the tape to be collectively shown as one file. A block has a fixed length of 512 KB, for example.

Figure 4A:
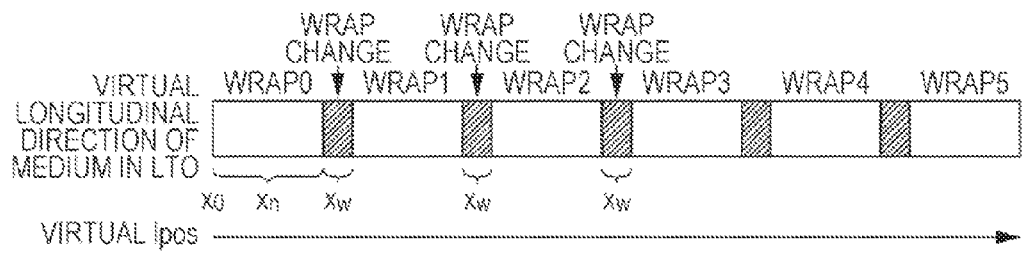

FIGS. 4A and 4B illustrate an example of a tape directory in accordance with an illustrative embodiment.

A tape directory represents a correspondence between the lpos representing the physical position and the block representing the position of the data of the file. A logical position of the file along the longitudinal direction of the tape can be grasped using the block number (block) specified by the extent of LTFS. The physical position on the tape can be identified by the lpos and the wrap. The tape directory represents a correspondence, i.e., (wrap, lpos)⇔(block), between the physical position on the tape, i.e., (wrap, lpos), and the range of an LTFS block on the medium, i.e., (block).

FIG. 4A is a conceptual diagram of the tape directory.

It is assumed that $x_0$ represents a position represented by the lpos at which writing of data starts and $x_n$ represents a length represented by the lpos over which data can be written using one wrap. Here, for all wraps, the lpos position at which writing of data starts is represented by $x_0$ in the forward direction and by $x_n$ for the reverse direction. The LTO tape drive estimates the next position based on the internally held tape directory, in response to a data read/write request. The tape drive holds an algorithm that estimates the lpos position or the block number using the tape directory. The tape directory only represents a correspondence between the block range and the lpos, and thus has a low precision. Because the accurate position on the medium is not obtainable, a rough physical position is identified from the tape directory and the block number so as to perform positioning.

FIG. 4B is a tape directory showing a correspondence between a virtual lpos and the block.

Relative to the head, medium runs in the forward direction for the even-numbered wrap, makes a wrap turn at the EOT, changes the wrap to the odd-numbered wrap, and then runs in the opposite direction. Now, to make calculation easier, a time-based distance ($x_w$) for a wrap change is converted into a linear length using the lpos. This converted lpos is called a virtual lpos. The virtual lpos is obtained by straightening the odd-numbered wrap at the EOT along the longitudinal direction so that the lpos represents the running distance relative to the head. FIG. 4B only presents a correspondence between the virtual lpos and the block. When a distance over which the tape moves at a tape moving speed v for a time $t_w$ taken for a wrap change is represented as the length $x_w$ using the virtual lpos, $x_w = v \times t_w$ is obtained. Likewise, the tape directory is rewritten by assuming the tape as one wrap. To make calculation easier, the position at which writing of data starts is corrected to be $x_0=0$.

FIGS. 5A and 5B illustrate a conceptual diagram of a method according to the present invention for reading one file from two media in accordance with an illustrative embodiment.

FIGS. 5A and 5B illustrate a case of reading different data portions of the same file recorded on a medium-a and a medium-b. Both the medium-a and the medium-b are used to read one file. The medium-a and the medium-b are mounted in the corresponding tape drives. This description is based on an assumption that it is to be determined from which of the two media the drive can start reading a target file earlier. It is determined that the read head of the drive takes a shorter time to reach the beginning position of the file stored on the medium-a (first medium). The other medium, i.e., the medium-b (next medium), is used to read a second data portion of the file. The last block of the file to be read from the medium-a is then determined. The last block is a block $b_i$ which is a position at which reading of the second data portion of the file from the next medium-b starts. The block $b_i$ is referred to as an intermediate time position (or intermediate block). This intermediate time position, i.e., the block $b_i$, is calculated in advance from a position where the time taken to read data up to the block $b_i$ from the first medium becomes equal to the time taken to read data from the block $b_i$ to the end from the next medium. Drives having these two media mounted therein may each calculate the position of the head and the movement time taken to reach the beginning of the data of the file, and notify the file system 50 or the controller 105 of the obtained results. Alternatively, the drives may transmit information regarding the head position and the position of the file to the file system 50 or the controller 105 so as to cause the file system 50 or the like to calculate the movement time.

FIG. 5A illustrates a case where data portions up to and starting from the intermediate block $b_i$ are read from the two media in parallel when reading one file. To make it easier to understand this case, the longitudinal direction of each medium is represented by one wrap so that calculation can be performed using the virtual lpos (FIG. 4B) with consideration of the time taken for wrap changes. The file system of the present invention reads the first data portion up to the intermediate block $b_i$ from the medium-a and the second data portion starting from the intermediate block $b_i$ from the medium-b. The intermediate block $b_i$ is represented by an intermediate time position $D_{a,i}$ located at the middle of a time-based distance from the current head position to an end-of-file position for the medium-a. It is necessary to complete reading the second data portion starting from the intermediate block $b_i$ until data is read up to the intermediate block $b_i$ after the head is moved for the medium-a. The intermediate block $b_i$ is calculated in advance by the file system 50 or the controller 105 so that the time $D_{a,i}$ taken to read data up to the intermediate block $b_i$ from the first medium becomes equal to a time $Db_{b,i}$ taken to read the data from the intermediate block $b_i$ to the end from the next medium. For example, LTFS determines that the target file is stored from a block $b_s$ to block $b_e$ on the medium based on the extents included in the index. The position of the file is converted into the virtual lpos using the virtual tape directory. The physical position of the file along the longitudinal direction of the tape is not accurately calculated from the block number. Accordingly, the position of the head of each of the drives in which the medium-a and the medium-b are mounted, and the beginning position and the end position of the file are calculated using the virtual lpos. Until transfer of the first data portion to the application 30 completes, all the following data read from the next medium is transferred to and temporarily held in the buffer of the file system 50. As soon as data transfer from the first medium completes, transmission of the second data portion read from the next medium from the buffer starts. FIG. 5B illustrates a relationship between the position of the head and the position of the file on the actual media, i.e., the medium-a and the medium-b. FIG. 5B illustrates that the file extends over a plurality of wraps with wrap change portions interposed therebetween.

The method illustrated in FIG. 5A aims to complete reading of the first data portion and reading of the second data portion from the two media (medium-a and medium-b) within the same amount of time if possible. Specifically, if reading of the first data portion from the medium-a and reading of the second data portion from the medium-b can be completed at the same time, the required time can be almost halved compared with the performance of reading data from one medium. Because the intermediate block $b_i$ which divides data of one file into the first data portion and the second data portion represents the intermediate time position, the sizes of these data portions are not the same. However, the intermediate block $b_i$ may be set to a position where the sizes of the first data portion and of the second data portion become the same. In this case, at least the same amount of second data portion as that of the first data portion is required to be read and transferred to the host 300 in parallel with reading and transfer of the first data portion from the medium-a to the host 300. Even if reading from the two media does not complete exactly at the same time, improved read performance is expected. For example, in the case of using three or more media holding the same file, a data portion to be read from each of the media may be obtained by equally dividing one file from the beginning. Because each tape drive can take a certain amount of time to read the corresponding data portion from the corresponding medium in parallel, read performance is improved significantly.

Figure 6:
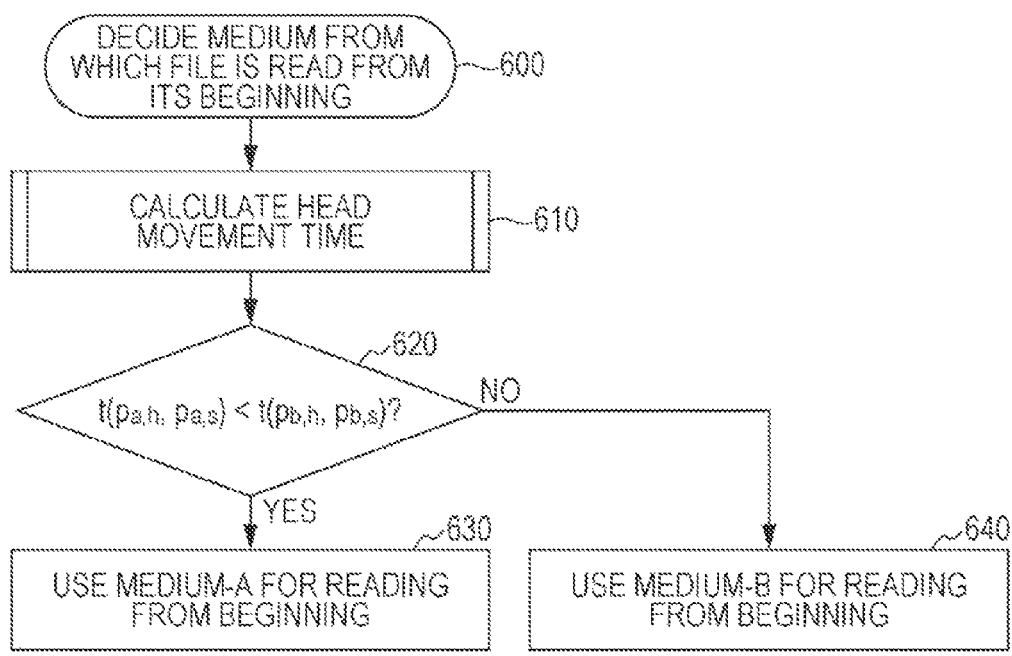
FIG. 6 illustrates a flowchart of how a medium from which a file is read from its beginning is determined in accordance with an illustrative embodiment.

FIG. 6 is a flowchart of h a medium from which a file is read from its beginning is determined in accordance with an illustrative embodiment.

It is assumed that each medium is mounted in the corresponding tape drive.

(600): A case is assumed where a read request to read one file is received from the host (server) 300 of the storage system 100. In the case where one file is read from two media, the file system 50 determines the first medium. The file system 50 can perform reading in units of blocks. It is assumed that the read-target file is written in the blocks $b_s$ to $b_e$. When the file is read, all the blocks $b_s$ to $b_e$ are read regardless of the offset and the number of bytes of data constituting the file.

(610): For each of the two media, the current head position and the beginning position and end position of the file are calculated.

The head position is represented by the virtual lpos. It is assumed that the head positions of the two media are represented by $p_{a,h}$ and $p_{b,h}$.

The positions of the target file on e medium-a and the medium-b are each represented by the beginning block $b_s$ and the end block $b_e$. Note that the positions of the file on the two media are different from each other. The beginning blocks $b_s$ and the end blocks $b_e$ representing the block position of the file are different between the medium-a and the medium-b. The block positions $b_s$ and $b_e$ are converted using the lpos with reference to the tap directory. Consequently, the physical position of the file on the medium-a is represented as the beginning position $p_{a,s}$ to the end position $p_{a,e}$. Similarly, the physical position of the file on the medium-b is represented as the beginning position $p_{b,s}$ to the end position $p_{b,e}$.

For the medium-a, the time taken for movement from the head position $p_{a,h}$ to the file beginning position $p_{a,s}$ is represented as $t(p_{a,h}, p_{a,s})$. For the medium-b, the time taken for movement from the head position $p_{b,h}$ to the file beginning position $p_{b,s}$ is represented as $t(p_{b,h}, p_{b,s})$. If the head experiences a wrap change before reaching the file beginning position, this calculated time includes the movement time taken for the wrap change ($x_w$).

(620): The resulting times taken for movement of the head to the file beginning position of both the media are compared with each other.

For example, if $t(p_{a,h}, p_{a,s}) < t(p_{b,h}, p_{b,s})$ the medium-a is determined as a medium from which the first data portion is to he read (630). If not (NO), the medium-b is determined as a medium from which the first data portion is to be read (640).

The above-described movement time calculation may take into account, if the medium has not been mounted in a corresponding tape drive, the time taken for loading the medium to the drive from the slot in the movement time.

The above has described the embodiment of using two media; however, the same flow is applied to how to select a medium from which the first data portion is to be read when three or more media are used. Media from which data portions following the first data portion are to be read are determined in the following manner. For example, if the sequentially divided data portions have the same size, the order is determined in accordance with the numbers pre-assigned to the rest of the plurality of media. That is, once the medium from which the first data portion is to be read is determined, a certain level of flexibility is allowed for assignment of media from which the following data portions are to be read. Most of the following data portions are read in parallel with reading of the first data portion from the medium-a. Thus, a significant improvement in read performance can be expected.

As described above, by employing the present invention, a storage system including a plurality of tape drives can improve its file read speed. Also, the occurrence frequency of performance degradation due to the backhitch or wrap change can be halved. The occurrence frequency of performance degradation due to reading resulting from the ERP can be halved. Although the embodiment of using two media has been mainly described, the scope of the present invention is not limited by this embodiment. The case of reading different data portions of the same file from three or more media is also within the scope of the present invention. It is obvious to those skilled in the art that various modifications and alterations can be adopted without departing from the spirit and the scope of the present invention.

The invention claimed is:

1. A method for reading a file from a plurality of media on which the file has been written, in a storage system including a plurality of drives connected to a host, and a buffer configured to temporarily hold data read from the plurality of drives, the method comprising:
   loading the plurality of media on which the file has been written to the plurality of drives to mount the plurality of media in the plurality of drives;
   dividing the file into a plurality of data portions in an order;
   determining a first medium from which a first subset of data portions within the plurality of data portions is to be read, the first medium being a medium that takes a shortest time to move from a current position of a read head of a corresponding drive to a beginning position of the file;
   determining a next medium from which a second subset of data portions within the plurality of data portions are to be read;
   executing reading of the second subset of data portions from the next medium and temporarily holding of the second subset of data portions in the buffer of the storage system in parallel with reading the first subset of data portions from the first medium to the host; and
   reading and transmitting the held second subset of data portions to the host in accordance with the order to from the file.

2. The method according to claim 1, wherein the plurality of data portions have a same size.

3. The method according to claim 1, wherein
   dividing the file into the plurality of data portions comprises calculating an intermediate time position at which the file is divided into the first data portion and the second data portion,
   wherein determining the intermediate time position comprises determining a time-based intermediate block position at which a movement time taken for the read head of the drive having the first medium mounted therein to read the first subset data portions from the first medium becomes equal to a movement time taken for the read head of the drive having the next medium mounted therein to read the second subset of data portions from the next medium.

4. The method according to claim 3, wherein the intermediate time position determined is determined based on a longitudinal position representing a physical position along a longitudinal direction of the first medium.

5. The method according to claim 4, wherein the intermediate time position is determined based on a time taken for a wrap change.

6. The method according to claim 4, wherein determining the intermediate time position comprises identifying the intermediate block position corresponding to the intermediate time position by referring to a tape directory representing a correspondence between a physical position and a block.

7. The method according to claim 3, wherein determining the intermediate time position comprises determining the intermediate time position based on a time taken for loading the first medium.

8. A storage system for reading a file from a plurality of media on which the file has been written, the storage system comprising:
   a plurality of drives connected to a host;
   a buffer configured to temporarily hold data read from the plurality of drives: and a read controller, wherein the read controller of the storage system is configured to:
load the plurality of media on which the file has been written to the plurality of drives to mount the plurality of media in the plurality of drives:
divide the file into a plurality of data portions in an order:
determine a first medium from which a first subset of data portions within the plurality of data portions are to be read, the first medium being a medium that takes a shortest time to move from a current position of a read head of a corresponding drive to a beginning position of the file:
determine a next medium from which a second subset data portions within the plurality of data portions are to be read;
execute reading of the second subset of data portions from the next medium and temporarily holding of the second subset of data portions in the buffer of the storage system in parallel with reading the first subset of data portions from the first medium to the host: and
read and transmit the held second subset data portions to the host in accordance with the order to form the file.

9. A computer program product for reading a file from a plurality of media on which the file has been written, in a storage system including a plurality of drives connected to a host, and a buffer configured to temporarily hold data read from the plurality of drives, the computer program product comprising a computer readable storage medium having a computer readable program stored therein, wherein the computer readable program, when executed on the storage system, causes the storage system to:
load the plurality of media on which the file has been written to the plurality of drives to mount the plurality of media in the plurality of drives;
divide the file into a plurality of data portions in an order:
determine a first medium from which a first subset of data portions within the plurality of data portions are to be read, the first medium being a medium that takes a shortest time to move from a current position of a read head of a corresponding drive to a beginning position of the file:
determine a next medium from which a second subset of data portions within the plurality of data portions are to be read;
execute reading of the second subset of data portions from the next medium and temporarily holding of the second subset of data portions in the buffer of the storage system in parallel with reading the first subset of data portions from the first medium to the host; and
read and transmit the held second subset of data portions to the host in accordance with the order to form the file.

10. The storage system according to claim 8, wherein the plurality of data portions have a same size.

11. The storage system according to claim 8, wherein dividing the file into the plurality of data portions comprises calculating an intermediate time position at which the file is divided into the first data portion and the second data portion,
wherein determining the intermediate time position comprises determining a time-based intermediate block position at which a movement time taken for the read head of the drive having the first medium mounted therein to read the first subset data portions from the first medium becomes equal to a movement time taken for the read head of the drive having the next medium mounted therein to read the second subset of data portions from the next medium.

12. The storage system according to claim 11, wherein the intermediate time position determined is determined based on a longitudinal position representing a physical position along a longitudinal direction of the first medium.

13. The storage system according to claim 12, wherein the intermediate time position is determined based on a time taken for a wrap change.

14. The storage system according to claim 12, wherein determining the intermediate time position comprises identifying the intermediate block position corresponding to the intermediate time position by referring to a tape directory representing a correspondence between a physical position and a block.

15. The storage system according to claim 11, wherein determining the intermediate time position comprises determining the intermediate time position based on a time taken for loading the first medium 16. The computer program product according to claim 9, wherein the plurality of data portions have a same size.

17. The computer program product according to claim 9, wherein dividing the file into the plurality of data portions comprises calculating an intermediate time position at which the file is divided into the first data portion and the second data portion,
wherein determining the intermediate time position comprises determining a time-based intermediate block position at which a movement time taken for the read head of the drive having the first medium mounted therein to read the first subset data portions from the first medium becomes equal to a movement time taken for the read head of the drive having the next medium mounted therein to read the second subset of data portions from the next medium.

18. The computer program product according to claim 17, wherein the intermediate time position determined is determined based on a longitudinal position representing a physical position along a longitudinal direction of the first medium.

19. The computer program product according to claim 18, wherein the intermediate time position is determined based on a time taken for a wrap change.

20. The computer program product according to claim 18, wherein determining the intermediate time position comprises identifying the intermediate block position corresponding to the intermediate time position by referring to a tape directory representing a correspondence between a physical position and a block.

* * * * *